United States Patent Office.

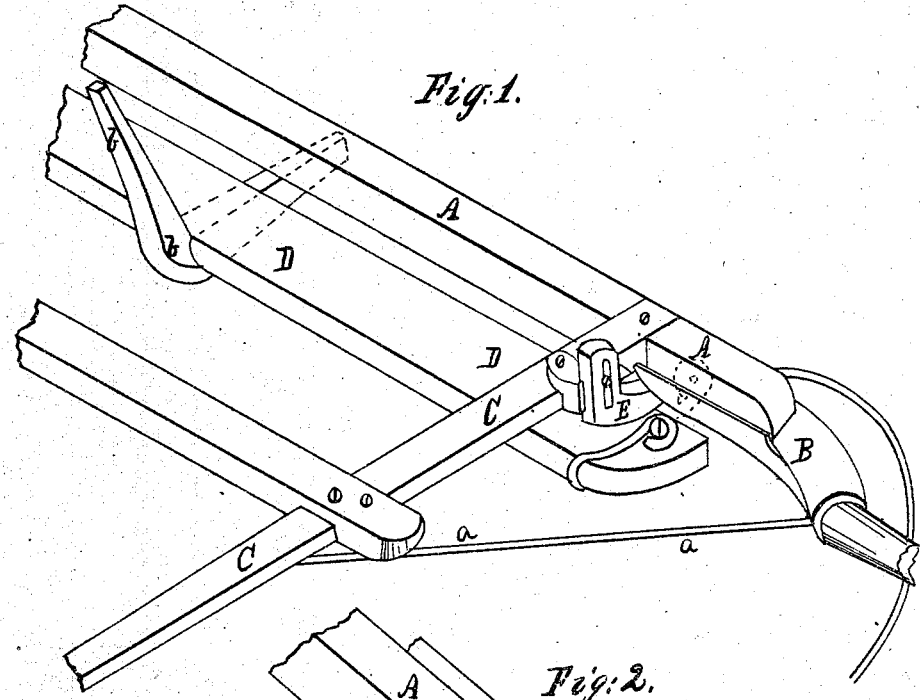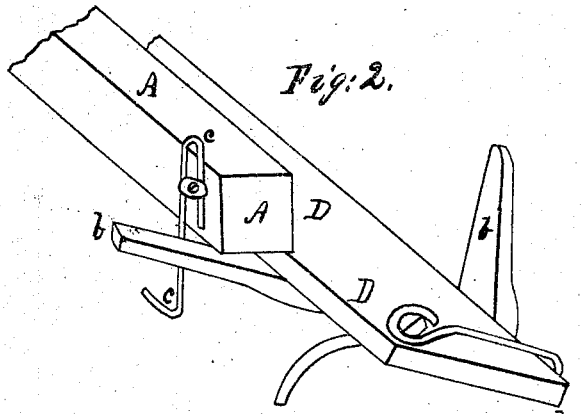

ALEXANDER J. SHUNK, OF DES MOINES, IOWA.

Letters Patent No. 105,733, dated July 26, 1870.

IMPROVEMENT IN HORSE HAY-RAKES.

The Schedule referred to in these Letters Patent and making part of the same.

I, ALEXANDER J. SHUNK, of Des Moines, in the county of Polk and State of Iowa, have invented certain Improvements in Horse Hay-Rakes, of which the following is a specification.

My invention is an improvement of my rake patented May 25, 1869, No. 90,592, and consists—

First, in providing a new adjustable hinge, and thereby hinging the rake-bar to the shaft.

Second, in providing an additional locking-device, to hold the rake more firmly when in use.

Figure 1 is a perspective view of a section of my improved rake.

A A is a straight wooden axle.

B is one of the curved metal axle-ends.

C C is one of the shafts.

D D is the rake-bar, to which the teeth are attached.

E is one of the adjustable hinges, fitted to the shaft. The other adjustable hinge shown is attached to the axle A A, same as in my other patent referred to.

a a is one of the bracing-rods connecting the shaft and the curved axle-end.

b b is the bent lever, fastened on the under side of the rake-bar, and used for locking the rake in a fixed position, when in use.

Figure 2 is a perspective sectional view, showing the additional locking-device.

A A is the axle.

D D, the rake-bar.

b b, the bent lever.

c c, an adjustable catch, secured to the axle.

My former device catches and holds the upper and front end of the bent lever. This additional device catches and holds the rear and lower end of the same.

Fitting the hinges to the shafts is a new way of suspending the rake. By so doing the dragging force is applied directly from the shafts to the rake, and very close to the horse, and the axle thereby is greatly relieved from strain. The adjustable hinges are also greatly strengthened, by changing their form and fastening, in the manner shown.

I am aware that a rake has been hinged to the shafts so far forward from the axle as to allow the rake-bar and teeth to operate in front of the axle; but, by my manner of hinging my rake-bar to the shaft, the rake-bar, together with the teeth, is allowed to swing underneath, and in rear of the axle.

The lengthening of the rear and lower end of the bent lever b b, to connect with the adjustable catch, and the application of the adjustable catch, together, form a new and useful device for the purpose stated.

Claims.

1. The peculiarly-shaped adjustable hinge E, combined with the shafts C C, and the rake-bar D D, substantially as described, for the purposes set forth.

2. The extension of the bent lever b b, and the adjustable catch c c, combined and operated, substantially as described, for a locking device.

ALEXANDER J. SHUNK.

Witnesses:
 GEO. F. WALKER,
 J. F. C. HAYES.